United States Patent [19]
Jones

[11] Patent Number: 5,020,510
[45] Date of Patent: Jun. 4, 1991

[54] METHOD AND APPARATUS FOR HEATING THE GROUND, ROADS OR THE LIKE

[76] Inventor: Darrell R. Jones, 7515 N. Fessenden, Portland, Oreg. 97203

[21] Appl. No.: 295,376

[22] Filed: Jan. 10, 1989

[51] Int. Cl.⁵ .................................................. F23C 5/00
[52] U.S. Cl. ..................... 126/271.1; 47/1.44; 47/1.42; 126/271.2 R
[58] Field of Search .............. 126/271.1, 271.2 R, 126/271.2 A, 271.3; 47/1.44, 1 R, 1.42

[56] References Cited

U.S. PATENT DOCUMENTS

| | | | |
|---|---|---|---|
| 3,606,877 | 9/1971 | Shipp | 126/271.2 A |
| 3,636,939 | 1/1972 | Sijbring | 126/271.2 R |
| 3,698,380 | 10/1972 | Cook | 126/271.2 A |
| 3,801,212 | 4/1974 | Cutler | 126/271.2 A X |
| 4,239,030 | 12/1980 | Benson | 126/271.1 |
| 4,561,800 | 12/1985 | Hatakenaka et al. | 126/271.2 A X |
| 4,644,683 | 2/1987 | Jones | |
| 4,834,002 | 5/1989 | LaChance | 126/271.1 X |

Primary Examiner—Larry Jones

[57] ABSTRACT

A substantially rectangular enclosure is in communication with a liquid propane heater. The enclosure is mounted on wheels for towing by a vehicle and includes a downwardly directed opening. A plenum interior to the enclosure receives the heated air and distributes the same in the enclosure. The disclosed burning unit may be towed to melt snow or ice or to destroy plants and seed without igniting them.

21 Claims, 4 Drawing Sheets

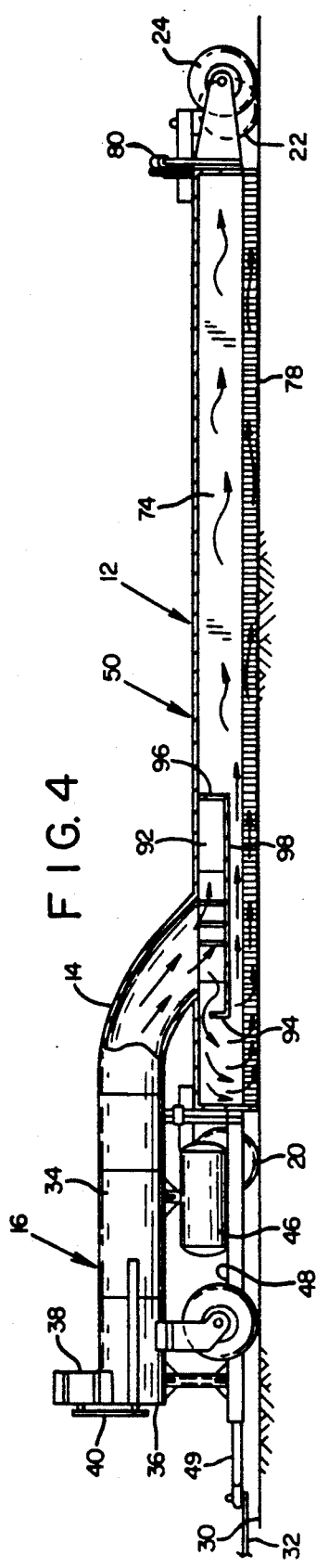

METHOD AND APPARATUS FOR HEATING THE GROUND, ROADS OR THE LIKE

BACKGROUND OF THE INVENTION

1. Field of the Invention

The instant invention pertains to methods and apparatus for heating the ground, roads or the like, and more particularly to such methods and apparatus which utilize a flow of heated air.

2. Description of the Related Art

There are several reasons why it may be necessary to periodically heat the surface of the ground, roads, runways or the like.

After grass is harvested from a field, stubble ranging from approximately 6 inches to 2 feet may be left in the field. In addition, the harvesting equipment is not able to fully collect all of the harvested grass and thus a layer of harvested grass remains on the stubble. In the past, after so harvesting the field, the practice has been simply to burn the harvested, but uncollected, grass and stubble in order to sterilize the surface leaving the living grass roots in the ground. Thus, when the grass grows back, it contains no weeds or extraneous plants.

The foregoing practice suffers from several disadvantages. First, burning the stubble and the unharvested grass is a waste of grass which could be used or sold by the farmer; however, in order to achieve the end of sterilizing the surface of the field, the stubble and harvested but uncollected grass must be left to provide fuel for the sterilizing fire. In addition, the smoke produced by such fires can greatly reduce visibility and create dangerous driving conditions for nearby traffic. Also, such fires can only be lit when weather conditions, particularly the wind and precipitation levels, permit. When a fire of a magnitude sufficient to burn plants in a field which may comprise many acres is ignited, the risk is always present that the fire will burn out of control causing unintended damage.

It is known in the prior art to fully harvest such a field, i.e., to cut the stubble close to the ground and to collect and bale substantially all the grass thus leaving relatively small amounts of stubble and cut grass in the field. A machine utilizing open flame directed toward the ground has been used to sterilize the ground after the field has been so harvested; however, this prior art device proved inefficient, and thus expensive, and time consuming.

Another instance in which it may be desirable to heat roads, runways or the like is when the same are covered with snow or ice. There are, of course, a number of traditional methods for clearing snow or ice from such surfaces, such as blowing, scraping, shoveling, etc. It is also know to clear jet runways using a machine which is drivable on the runway and which generates an open flame directed toward the runway surface to melt ice and snow. Such machines are expensive to operate and take a great deal of time to melt ice and snow from relatively small portions of the runway.

SUMMARY OF THE INVENTION

The present invention comprises a method of heating the surface of the ground, roads or the like which incorporates an enclosure. The enclosure comprises a substantially planar member having a downwardly directed side extending therefrom. The planar member is positioned generally parallel to the surface to be heated. A flow of hot air is generated and is directed into the enclosure which is driven over the surface. Apparatus is provided for performing the steps of the method.

It is a general object of the present invention to provide a method and apparatus for heating the surface of the ground, roads or the like which utilizes a flow of heated air.

It is a more specific object of the present invention to provide such a method and apparatus for destroying plants and seeds on the ground.

It is another specific object of the present invention to provide such a method and apparatus for melting ice or snow.

These and other objects and advantages of the present invention will become more readily apparent when the following detailed description is read in view of the accompanying drawing.

BRIEF DESCRIPTION OF THE DRAWING

FIG. 4 is a view taken along line 4—4 in FIG. 1.

FIG. 5 is a partial view taken along line 5—5 in FIG. 1.

DETAILED DESCRIPTION OF THE PREFERRED EMBODIMENT

Figure 1:
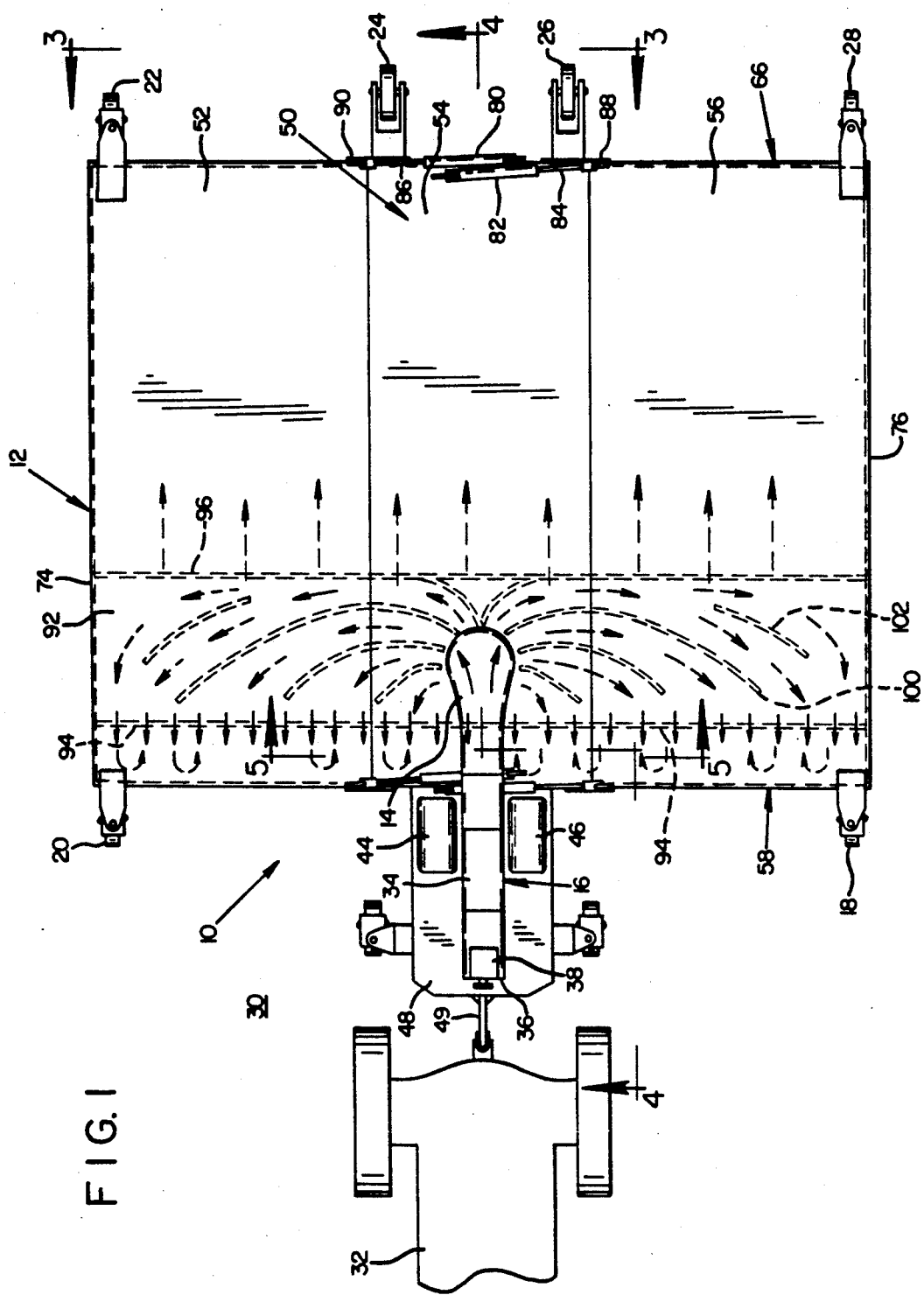
FIG. 1 is a top plan view of a heating unit constructed in accordance with the present invention.
Figure 2:
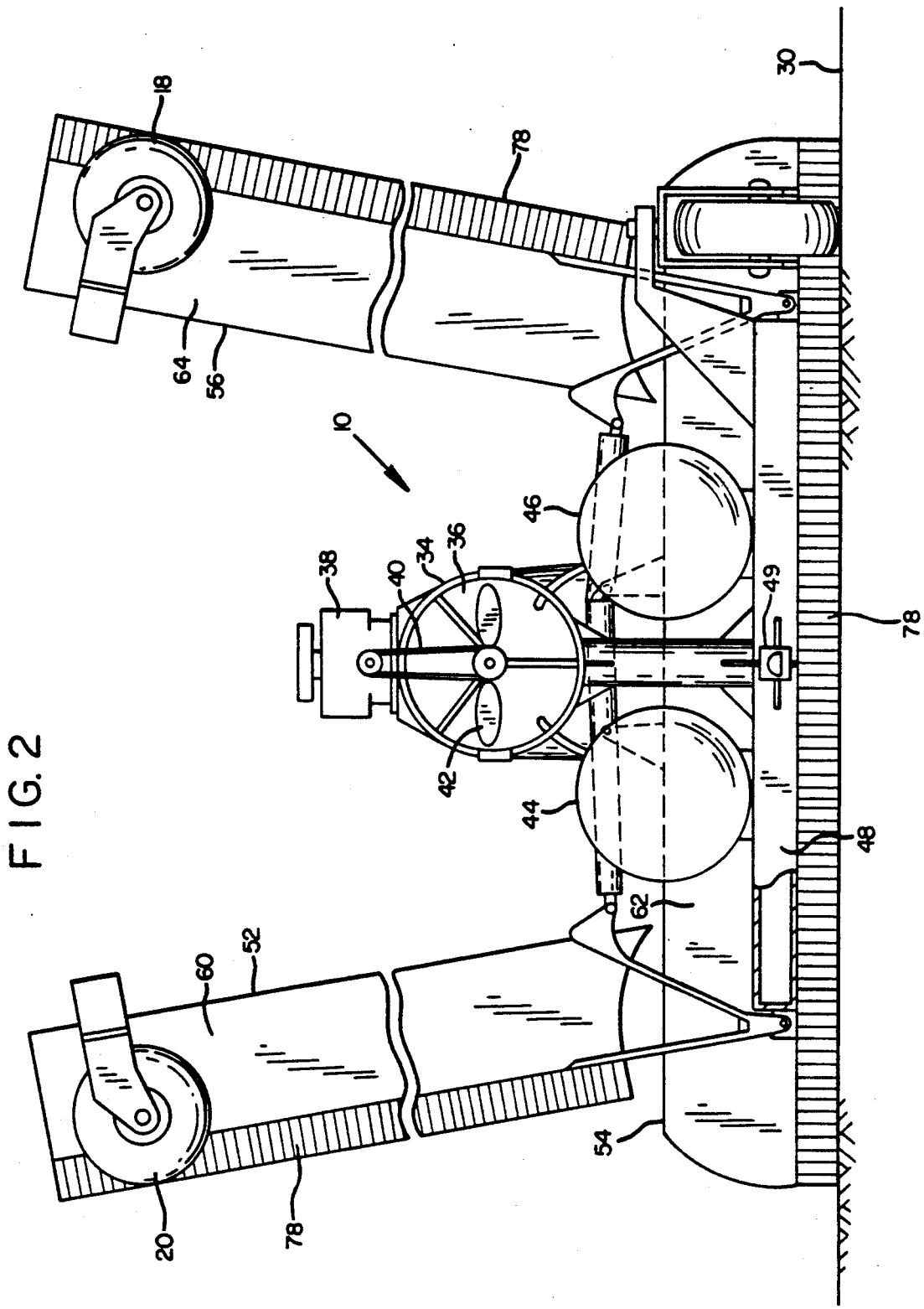
FIG. 2 is a front elevation view of the heating unit configured for transporting the same.

Turning attention now to FIGS. 1 and 2, indicated generally at 10 is a heating unit constructed in accordance with the present invention. Generally speaking, heating unit 10 includes an enclosure 12 which is in communication, via a duct 14, with a heater 16. Heater 16 is referred to herein as means for generating a flow of heated air.

The enclosure is mounted on a plurality of wheels, like wheels 18, 20, 22, 24, 26, and 28. The wheels are referred to herein as means for moving the enclosure over a surface, like surface 30, which supports the enclosure.

A motorized vehicle 32 is towably connected to the heating unit and is also supported on surface 30. Vehicle 32 also comprises means for moving the enclosure over the surface.

Speaking only generally concerning the manner of operation of heating unit 10, heater 16 generates a flow of heated air which is provided to enclosure 12 via duct 14. Portions of surface 30 which are covered by the enclosure are exposed directly to heated air through the open underside, best viewed in FIG. 4, of the enclosure.

As vehicle 32 tows enclosure 12 across surface 30, those portions of surface 30 over which the enclosure is towed are heated by the warm air. As will be described in more detail, the heating unit can be used to heat the ground, roads, runways or the like. Such heating may be for the purpose of destroying plants and seeds on the surface of a field of harvested crops or for melting snow or ice.

Considering the structure of heating unit 10 in more detail, attention will first be given to heater 16. The heater is substantially identical in structure and operation to that described in U.S. Pat. No. 4,644,683 issued to Darrell R. Jones, the applicant herein. The description contained in the Jones '683 patent is incorporated herein by reference. Generally stated, the structure and operation of heater 16 is as follows: Heater 16 includes a tubular housing 34 having an inlet end 36 and an outlet end which is connected directly to duct 14. An internal combustion motor 38 is mounted on housing 34 over inlet end 36. The motor is drivingly connected, via a belt 40, to the drive shaft of a fan 42, best viewed in FIG. 2. The drive shaft of fan 42 is coaxial with respect to housing 34. The fan is oriented to blow air into inlet end 36 when motor 38 drives the fan.

A pair of liquid propane tanks 44, 46 are mounted on a platform 48 which is rigidly attached to enclosure 12 and extends forwardly therefrom. A towing hitch 49 extends forwardly from platform 48 and is used to releasably secure vehicle 32 to heating unit 10. Liquid propane is provided via a fuel line (not shown) from the tanks to the interior of housing 34. In the housing, the fuel line is coiled to facilitate evaporation and pre-heating, when the heater is operating, of propane. A burner nozzle (not visible) is mounted on the end of the fuel line inside the housing and is received in a venturi element (also not visible) in the housing. A spark igniter is contained within the housing for igniting fuel.

When it is desired to activate heater 16, a valve (not shown) from propane tanks 44, 46 is opened, thus providing a flow of liquid propane in the fuel lines which extend from the propane tanks to tubular housing 34. The valve is of the regulating type to enable adjustment of the pressure of the fuel provided to the heater. When the propane exits the burner, it is substantially evaporated. Motor 38 is energized, thus driving fan 42 which provides a blast of air into the tubular housing and mixes the same with evaporated propane. The speed of motor 38 is variable to enable adjustment of the volume of air provided to the burner. When fuel is flowing to the burner and the fan is turning, the spark igniter is energized to ignite the fuel and air mixture. Heated air is thus provided from heater 16 into duct 14 for so long as the propane flows and fan 42 provides air to tubular housing 34.

Figure 3:
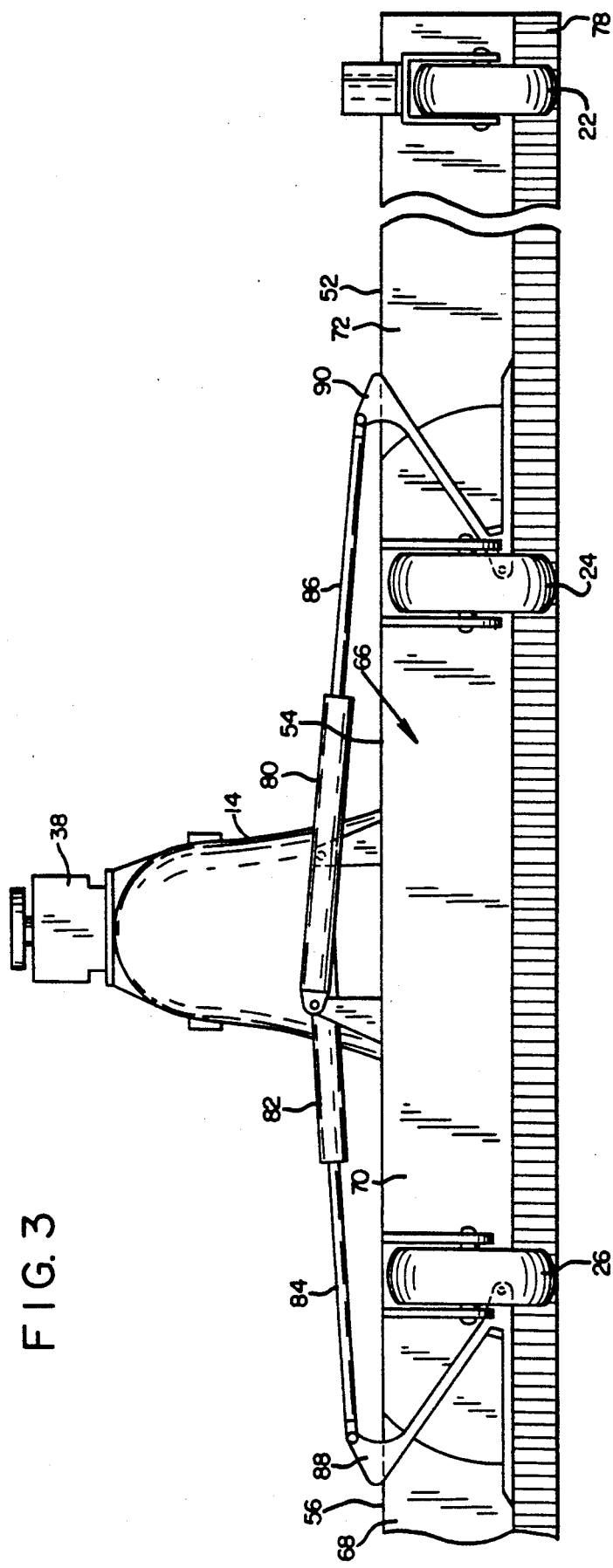
FIG. 3 is a view taken along line 3—3 in FIG. 1.

As mentioned above, one end of duct 14 is connected to the outlet end of heater 16. The other end of duct 14 is connected to the top of enclosure 12. The enclosure includes a substantially planar top 50 made up of three sections 52, 54, 56. The enclosure further includes a front wall 58, made up of sections 60, 62, 64, best viewed in FIG. 2. A rear enclosure wall 66 comprises sections 68, 70, 72, viewable in FIG. 3. A side wall 74, the inner surface of which is viewable in FIG. 4, has an upper edge which is joined along the length thereof with an edge of section 52. The forward edges of sections 52, 74, are joined with front wall section 60 and the rearward edges of sections 52, 74, are joined with rear wall section 72.

A second side wall 76 is similarly joined to its associated top, front and rear sections on the other side of the enclosure.

A flexible wire mesh 78 is suspended from the lower edges of the front, rear and side walls of the enclosure and defines the lowermost portion of the enclosure. A downwardly-directed opening is defined by the lower edges of the enclosure walls and the mesh about the circumference of the enclosure. In the present embodiment of the invention, the enclosure, when in the configuration of FIG. 1, measures 30 feet from the front wall to the rear wall and 36 feet between the side walls with each of the three sections being approximately 12 feet in width and 30 feet in length. Each of the side walls, and each of the sections forming the front and rear walls, is approximately 1½ feet from top to bottom.

The distance between the bottom of each wall (and each section) to surface 30 is approximately 6 inches. In the instant embodiment of the invention, mesh 78 spans this gap. Although not illustrated herein for the sake of clarity, an internal truss is contained within the enclosure to increase its rigidity.

A pair of hydraulic rams 80, 82 are mounted on middle section 54 of the enclosure top. Each ram has a rod 84, 86 which is pivotally connected to members 88, 90, respectively, in the outboard enclosure sections. When rams 80, 82 are in the configuration illustrated in FIG. 3, contraction of rods 84, 86 raises the outboard enclosure sections to the configuration shown in FIG. 2 as will be described in more detail hereinafter.

A plenum 92 is formed inside enclosure 12 and extends transversely between side walls 74, 76 and between front and rear plenum walls 94, 96, respectively. The upper portion of plenum 92 is defined by top 50 with the bottom portion being defined by a bottom plate 98, viewable in FIGS. 4 and 5. Bottom plate 98, as are front and rear plenum walls 94, 96, is divided into three sections with the divisions occurring at the same place as the enclosure divisions to facilitate movement of the enclosure between the configurations of FIGS. 2 and 3. Plenum 92 is referred to herein as means for distributing air flow in the enclosure.

As best viewed in FIG. 4, duct 14 communicates with enclosure 12 via plenum 92. The plenum includes a plurality of upright channel-defining members, like members 100, 102. The channel-defining members are each curved, some of the curves having different radii than others. A number of the members have an end beneath the area in which duct 14 communicates with the plenum, thereby defining channels between the members for directing air flowing from duct 14 into the plenum as indicated by the arrows in FIG. 1.

A plurality of openings, like openings 104, 106, in FIG. 5, are formed in the upper portion of plenum front wall 94 along the length thereof. The channel-defining members form channels which direct air flowing from duct 14 generally toward the openings, like openings 104, 106, in the plenum. The channel-defining members are means for distributing air to the openings. Front plenum wall 94 in conjunction with the openings therein is referred to herein as a weir over which heated air flows.

Each opening, like openings 104, 106, includes a slidable plate, like plates 108, 110, mounted on front plenum wall 94. The plates are laterally slidable for selectively adjusting the size of each opening.

In operation, when it is desired to transport heating unit 10 to a location where it will be used, rams 80, 82 are contracted, thus drawing up the outboard sections of the enclosure to the configuration shown in FIG. 2. A vehicle, like vehicle 32, is connected to heating unit 10 via towing hitch 49 as shown in FIG. 1. The burning unit is then towed under power of vehicle 32. With the outboard enclosure sections in the configuration shown in FIG. 2, burning unit 10 can pass through gates and travel on roadways and the like. When the burning unit is located on the surface, like surface 30, which it is desired to heat, rams 80, 82 are extended to the configuration shown in FIG. 3 thereby lowering the outboard enclosure sections into position for using the heating unit.

Thereafter, heater 16 is activated as described above, namely, a flow of liquid propane from tanks 44, 46 is started in the fuel line leading to the burner inside tubular housing 34; motor 38 is started thereby driving fan 42; and the fuel and air mixture is ignited thereby generating a flow of heated air into enclosure 12 via duct 14. The temperature of the air entering the enclosure may be adjusted by varying the fuel to air ratio in the burner. This ratio is varied by adjusting the volume of air flow and/or the pressure of propane provided to the burner.

Heated air flows through duct 14 into plenum 92 and is routed via the channel-defining members, like members 100, 102, generally in a pattern indicated by the arrows in FIG. 1. The heated air is directed toward forward wall 94 of the plenum and flows through the openings, like openings 104, 106 in wall 94. The slidable plates, like plates 108, 110 may be adjusted to adjust the amount of heated air flowing through the openings. The heated air flows through the openings and into the space defined in the enclosure between front plenum wall 94 and front enclosure wall 58. As best viewed in FIG. 4, a substantial space is defined between surface 30 and bottom plate 98 of the plenum, thereby creating a channel through which the heated air flows, as indicated by the arrows, to that portion of the enclosure rearward of plenum 92.

When the burner is generating a flow of heated air as described above, vehicle 32 tows heating unit 10 over surface 30. Plants and the like over which the burning unit is towed are unlikely to enter plenum 92 via the openings, like openings 104, 106, formed therein due to the upper location of the openings in the plenum. Heated air is maintained in the enclosure by the front, rear and side walls thereof and by mesh 78 which extends about the circumference thereof.

In practicing the method and apparatus of the present invention, it is desirable to maintain the volume of the enclosure relatively small relative to the downwardly-directed enclosure opening. This minimizes the surface area of the front, rear and side walls and enclosure top through which heat escapes rather than being utilized to warm surface 30. In the instant embodiment of the invention, the ratio of the top and front, side and rear walls (including mesh 78) of the enclosure surface area to the opening area is approximately 1.25:1. In order to maintain reasonable efficiency in the practice of the method and apparatus of the invention, it would be desirable to keep this ratio below approximately 1.5:1.

The time period during which a selected portion of surface 30 is exposed to heated air inside enclosure 12 is varied by varying the towing speed of vehicle 32. As mentioned, the temperature of the heated air entering the enclosure can be varied by changing the fuel to air ratio in burner 16.

The heat of the air entering the enclosure can be changed by changing 1) the speed of fan 42 or 2) the pressure at which propane is supplied to heater 16. The pressure is changed by adjusting the regulator valve (not shown) which is disposed in the fuel line (also not shown) between tanks 44, 46 and burner 16. In practice, it is desirable to maintain the fuel and air mixture at substantially the same proportions. When it is desired to reduce the temperature of the air in the enclosure, fan speed and fuel pressure are both proportionately reduced thereby maintaining the fuel-to-air ratio while reducing the total flow through the burner. An increase in temperature is achieved by proportionate increases of fuel pressure and air flow generated by fan 42.

It has been determined that a temperature of greater than 250° maintained for approximately 10 seconds is suitable for sterilizing ground from which grass has been substantially fully harvested. Such exposure kills weeds, seeds and the like and generally sterilizes the surface of the ground. At the same time, this exposure is not such that the plants and grass stubble on the surface ignite. Thus, when the burner is adjusted to produce an average of 250° in the enclosure and with heating unit 10 being towed at approximately 3 miles per hour, the instant embodiment of the invention can be used to sterilize a field after grass has been substantially fully harvested therefrom.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for killing plants growing in the ground comprising the steps of:
   generating a flow of heated air having a moisture content equal to or less than that of the ambient air;
   placing an enclosure having a single downwardly-directed opening over the plants for a selected time period, said enclosure further having a ratio of less than 1.5:1 of enclosure surface area to opening area;
   directing the heated air into the enclosure; and
   adjusting the temperature of the air and the time period so that the plants are killed by the heat but are not ignited.

2. A method according to claim 1 wherein the step of placing an enclosure over the plants for a selected time period comprises the steps of:
   providing a substantially planar member having a downwardly directed side extending therefrom;
   positioning the planar member generally parallel to the ground; and
   moving the planar member over the plants.

3. A method according to claim 1 wherein the step of generating a flow of heated air comprises:
   igniting a burner; and
   directing a flow of air across the burner.

4. A method according to claim 1 wherein said method further comprises the step of distributing the heated air in said enclosure.

5. A method for heating the surface of the ground, roads or the like comprising the steps of:
   providing an enclosure comprising a substantially planar member having a downwardly directed side extending therefrom and a single downwardly-directed opening bounded by said side, said enclosure further having a ratio of less than 1.5:1 of enclosure surface area to opening area;
   positioning the planar member generally parallel to the surface;
   generating a flow of heated air having a moisture content equal to or less than that of the ambient air;
   directing the heated air into the enclosure; and
   driving the enclosure over the surface thereby uniformly heating the surface.

6. A method according to claim 5 wherein the surface over which the enclosure is moved is covered with ice or snow and wherein said method further comprises the step of adjusting the temperature of the air and the time during which the enclosure is over a selected surface area so that the snow or ice covering the selected surface area melts.

7. A method according to claim 5 wherein the surface over which the enclosure is moved includes growing plants and wherein said method further comprises the step of adjusting the temperature of the air and the time during which the enclosure is over a selected surface area so that the plants are killed by the heat but are not ignited.

8. A method according to claim 5 wherein the step of generating a flow of heated air comprises:
   igniting a burner; and
   directing a flow of air across the burner.

9. A method according to claim 5 wherein said method further comprises the step of distributing the heated air in said enclosure.

10. Apparatus for heating the surface of the ground, roads or the like comprising:
   means for generating a flow of heated air having a moisture content equal to or less than that of the ambient air;
   an enclosure in fluid communication with the heated air flow and having a single downwardly directed opening for directing such an air flow toward the surface when said apparatus is in operative condition, said enclosure further having a ratio of less than 1.5:1 of enclosure surface area to opening area;
   means for distributing the air flow in said enclosure; and
   means for moving the enclosure over the surface.

11. Apparatus according to claim 10 wherein said means for generating a flow of heated air comprises:
   a gas burner; and
   fan means for blowing air across said burner when said apparatus is in operative condition.

12. Apparatus according to claim 10 wherein said enclosure is substantially in the shape of a rectangular parallel pipe.

13. Apparatus according to claim 12 wherein said opening is disposed between the lower edges of each side of said enclosure.

14. Apparatus for heating the surface of the ground, roads or the like comprising:
   means for generating a flow of heated air;
   an enclosure substantially in the shape of a rectangular parallelepiped in fluid communication with the heated air flow and having a downwardly directed opening disposed between the lower edges of each side of said enclosure for directing such an air flow toward the surface when said apparatus is in operative condition, said enclosure further having a ratio of less than 1.5:1 of enclosure surface area to opening area;
   wire mesh having from the lower edge of each side of said enclosure and extending to the surface supporting said apparatus for retaining heated air in the enclosure;
   means for distributing the air flow in said enclosure; and
   means for moving the enclosure over the surface.

15. Apparatus according to claim 13 wherein said distributing means comprises a plenum oriented transversely to the direction of enclosure movement for receiving the heated air flow.

16. Apparatus according to claim 15 wherein said plenum extends from one side of said enclosure to the opposing side thereof.

17. Apparatus according to claim 15 wherein said plenum includes a plurality of openings formed in a forward surface thereof for communicating heated air to the remainder of said enclosure.

18. Apparatus according to claim 17 wherein said openings are formed in an upper part of said forward plenum portion thereby defining a weir over which such heated air flows.

19. Apparatus according to claim 17 wherein said plenum is spaced above the surface, when said apparatus is in operative condition, for communicating heated air flow from said plenum openings to the enclosure rearward of said plenum.

20. Apparatus according to claim 17 wherein said plenum includes means for distributing such heated air to the openings.

21. Apparatus according to claim 20 wherein said means for distributing such heated air to the openings comprises a plurality of upright channel-defining members.

* * * * *

UNITED STATES PATENT AND TRADEMARK OFFICE
CERTIFICATE OF CORRECTION

PATENT NO. : 5,020,510

DATED : June 4, 1991

INVENTOR(S) : Darrell R. Jones

It is certified that error appears in the above-identified patent and that said Letters Patent is hereby corrected as shown below:

Column 3      line 68, change "1 1/2" to --1 - 1/2--;

Column 8      line 10, change "having" to --hanging--.

Signed and Sealed this

Thirtieth Day of March, 1993

Attest:

STEPHEN G. KUNIN

*Attesting Officer*     Acting Commissioner of Patents and Trademarks